United States Patent [19]
Petersen

[11] 3,965,404
[45] June 22, 1976

[54] APPARATUS AND METHOD OF BRAKING A UNIVERSAL MOTOR FOR OPERATING A COMPACT WINCH

[75] Inventor: Paul S. Petersen, Minnetonka, Minn.

[73] Assignee: Cordem Corporation, Minneapolis, Minn.

[22] Filed: Aug. 17, 1973

[21] Appl. No.: 389,330

[52] U.S. Cl. ............................... 318/261; 318/377
[51] Int. Cl.[2] ......................................... H02P 3/14
[58] Field of Search ........... 318/261, 273, 375, 376, 318/377

[56] References Cited
UNITED STATES PATENTS

| | | | |
|---|---|---|---|
| 3,628,112 | 12/1971 | Gross | 318/261 X |
| 3,665,275 | 5/1972 | Robinson | 318/261 |

*Primary Examiner*—Robert K. Schaefer
*Assistant Examiner*—W. E. Duncanson, Jr.
*Attorney, Agent, or Firm*—H. Dale Palmatier; James R. Haller

[57] ABSTRACT

In a universal motor particularly adapted for operating a compact winch, triggering the dynamic braking, as may be required in an overhauling load condition by applying a pulse of current through the field winding as to produce a magnetic field to assuredly cause the armature to start generating a current which is directed through the field winding and load resistance, the pulse of current being supplied from a condenser connected in shunt with the field winding or the condenser may be connected in series with the field winding and in shunt with the switch by which the field winding is connected to the supply line; a time delayed switching shorting the dynamic braking resistance to increase the generated current and produce renewed or a second dynamic braking effect to reduce the speed of the motor sufficiently to allow the worm and worm gear speed reduction to lock against further rotation under influence of the winch drum; and low speed braking being increased to produce stopping of the motor and winch drum by a worm and worm gear with significantly reduced surface contact area between the worm gear teeth and worm threads.

20 Claims, 9 Drawing Figures

FIG. 1

APPARATUS AND METHOD OF BRAKING A UNIVERSAL MOTOR FOR OPERATING A COMPACT WINCH

BACKGROUND OF THE INVENTION

Series wound a.c. motors have both the field and armature windings excited from the line. Such motors employ brushes to supply current through the commutator and to the rotating armature windings. These motors are commonly known as universal motors and are regularly used in many commercial models of sewing machines, typewriters, drills, saws and other small appliances.

One outstanding characteristic of this type of motor is its high power and high speed per unit of weight. The speed of a universal motor is not particularly controlled or regulated by the a.c. frequency of the power source, or the number of poles in the motor structure. The principal limitation which governs the speed of the universal motor is the total resistance of the motor. In most commonly known universal motors which are sold commercially, the highest horse power output will occur in the speed range of 5,000 to 10,000 r.p.m. Under no-load conditions, various universal motors will run in the speed ranges of 18,000 to 25,000 r.p.m.; and universal motors used to operate winches will have a no-load speed of approximately 18,000 r.p.m.

Most universal motors are not subjected to an overspeed condition, but universal motors used to operate winches are subjected to an overspeed condition wherein the speed of the motor may be in the range up to approximately 25,000 r.p.m. This overspeed condition is caused when a physical load is being lowered by the winch, such that the physical load and the motor are both urging the winch spool or drum in the same direction. This may be referred to as an overhauling load condition.

The high speed of these universal motors and the typical uses of these motors may require that braking be accomplished to stop the armature whenever the motor is disconnected from the line. Dynamic braking of universal motors has been accomplished previously by proper switching when the source of power is disconnected. The switching disconnects the line from the input terminals of the motor; the connections to the commutator brushes of the armature are reversed so as to instantaneously cause the motor to commence acting as a generator; and a low resistance is connected across the input terminals of the motor so as to act as a load for the series connected field and armature windings which are now operating as a generator. The armature will very rapidly decelerate, and in most situations will completely stop.

Such universal motors have been commercially used to power small compact winches. A small motor turning at high speed can develop an adequate amount of mechanical power output when applied to the winch drum or spool through a pair of tandemly arranged worm and gear speed reductions, so that the winch and motor combination may continue to have a reasonable size and weight in relation to its power output and general usefulness.

SUMMARY OF THE INVENTION

This invention relates to the dynamic braking of a universal motor and is particularly applicable when such a motor is used to operate a compact winch. It has been observed that dynamic braking of a universal motor may have some deficiencies under certain conditions when the motor is being operated to drive a winch. It has been particularly observed that the dynamic braking may fail to stop a winch motor when the winch is being operated to lower the physical load. In this condition wherein the load has an overhauling effect on the motor, the motor is operating to turn the winch spool in one direction, and the physical load carried by the winch cable is also tending to turn the winch drum in the same direction.

Generally, the dynamic braking of a new universal motor will be effective to sufficiently brake the motor and winch to such a low speed that the worm and gear speed reduction mechanism will lock the winch drum against further turning. However, it has been further observed that if the universal motor has been in service for several months to several years, the dynamic braking may be inoperative to stop the universal motor in this condition where the load is overhauling the motor.

Even after a considerable amount of detailed study of these conditions, it had not been apparent as to the reasons for the failure of the dynamic braking.

It has been known that after a motor has been in service for several months to several years, depending upon the loading and usage, the commutator bars build up a significant corrosion or coating which tends to act as a partial insulator between the commutator bars and the carbon brushes. In the overhauling load condition such as wherein the physical load tends to revolve the winch drum in the same direction that it is revolved by the motor, the current being supplied into the motor is reduced below the level of current ordinarily drawn by the motor in a no-load condition.

According to the present invention, it has been found that it is helpful to trigger the dynamic braking of a universal motor by applying a pulse of current through the field winding so as to assure commencement of the generator effect and building of a generated current through the load resistance.

It has been surmised that in the overhauling load condition, the current drawn from the line decreases to a point at which the field structure is almost entirely degaussed, and to the point that the residual magnetic field is not strong enough to cause production of an electrical current in the revolving armature; and whatever small voltage that is generated in the armature may not be able to break down and pass through the insulating corrosion on the commutator. This may result in the failure of the dynamic braking.

The pulse of electrical current supplied to the field winding may be generated in any of a number of different ways. In one form, the field coil is disconnected from the line by switching, but it is assumed that the line remains energized and a pulse of current is supplied from the line through a rectifier and blocking condenser to trigger the dynamic braking immediately after the disconnect by switching is effected.

In another form wherein it is assumed that the line itself may be de-energized, a condenser is connected in series with a diode and across the entire line voltage when the motor is in running condition, and then, by switching, the condenser is connected directly across the field winding when the motor is de-energized so that a magnetic field is generated to produce current in the revolving armature winding.

The armature of a universal motor will not be entirely stopped by dynamic braking. As the speed of the motor approaches zero, the braking effect is lost because there is no further significant generation of current in the armature. The time interval from the moment when braking is commenced until the braking effect is lost due to the substantial speed reduction, may be in the range of one-fourth of a second.

After the effect of the dymanic braking is lost the final stopping of the motor must be accomplished by the worm and worm gear speed reduction mechanism of the winch, and if the dynamic braking has reduced the speed to the extent that the worm and worm gear speed reduction mechanism will lock and prevent further turning, of course the motor and winch drum will completely stop and be held in stopped condition by the worm and worm gear speed reduction mechanism.

However, if the speed reduction produced by the dymanic braking does not bring the speed down the the point wherein the worm and worm gear speed reduction mechanism will produce the final stopping, the overhauling load may cause continued turning of the winch drum and the motor armature and may cause a progressive acceleration of the motor again.

According to the present invention, a second dynamic braking is effected by entirely shorting out the braking resistance, whereupon the slowly rotating armature of the motor, acting as a generator, will produce current and sufficiently load the "generator" as to substantially stop the rotating armature. The armature will be brought down at least to the self-locking speed range of the worm and gear speed reducing mechanism. The shorting of the braking resistance may be accomplished by a time delay relay, the coil of which is normally energized and continues to be supplied by a discharging condenser after the line current is removed from the motor whereupon when the relay contacts return to their normally closed condition, about a half second after disconnection from the line and after the principal braking of the universal motor has been effected, the short circuit occurs and completes the dynamic braking effort in coordination with the self-locking worm and worm gear speed reducing mechanism.

An additional final braking effect may be obtained in the worm and worm gear speed reducing mechanism of a winch by adjusting the shape of the worm gear teeth such that the lubricating film by which the worm and the worm gear "float" on each other is materially reduced at slow speeds with the effect that more metal to metal contact is obtained at the extremely slow speed to effect the final braking of the motor and winch mechanism.

The shape of the worm gear teeth is changed to reduce the contact face area of the teeth. The teeth of the worm gear are shortened in a radial direction without changing the pitch diameter of the worm gear; and the shapes of the ends of the worm gear teeth are changed so that the ends of the teeth form a partial cylinder around the rotation axis of the gear. No adverse effect obtains during normal operating speeds of the winch, but as the speed of the winch and motor approach zero, the change in the shape of the worm gear teeth assist in producing the final braking effort to stop the motor and winch drum.

DETAILED DESCRIPTION OF INVENTION

Figures 1, 2:
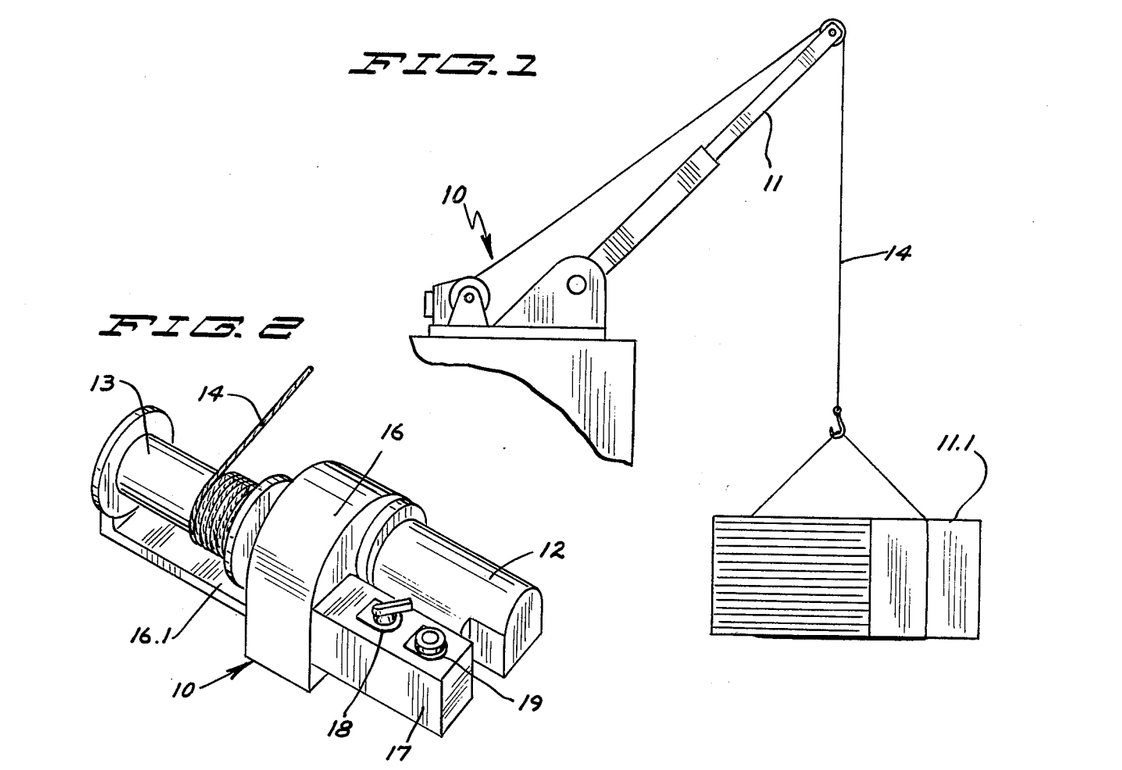
FIG. 1 is a perspective view illustrating a typical winch used to raise and lower a load.
FIG. 2 is a perspective view of a winch employing a universal motor.

The present invention is particularly related to a compact winch 10, which, as illustrated in FIG. 1, may be used with a boom 11 to raise and lower a load 11.1. The overall winch 10 is of a compact construction and has an overall length of approximately twenty inches and will lift approximately 1200 pounds. The universal motor 12 of the winch may have a capability of 1.3 h.p., and the winch drum or spool may have a cable capacity of 135 feet of one-fourth inch cable. The cable 14 commonly used with this type of compact winch is known as galvanized aircraft cable, and under load conditions with the drum 13 filled, the winch may reel in the cable at an approximate speed of 23 feet per minute, and pay out the cable under load conditions at approximately 55 feet per minute. Under no-load conditions, the cable may be reeled in and payed out at approximately the same speed of 37 feet per minute.

A worm and worm gear speed reduction mechanism 15 interconnects the motor 12 with the winch drum 13 and is confined in a gear case or housing 16 which forms the frame for the winch 10 and is formed integrally of the base 16.1 by which the winch is secured to a suitable footing or mounting structure.

A control housing 17 confines the operating circuitry for motor 12 and serves to mount two external controls, a forward — reverse double pole double throw switch 18 and a run — stop multiple contact push button spring return switch 19 which requires that the push button be held down whenever the winch motor is to be operated, and when the push button is released, the motor will stop.

The motor 12 is a universal motor, and when the motor is being operated, the armature 12.1 is connected in series with the field winding 12.2 so that all of the current drawn by the motor passes through both the armature and the field winding. In the control circuit depicted in FIG. 3, the power supply line 20, 20.1 is connected into the motor control circuitry at terminals 20.2, 20.3 which may be either permanent or disconnectable. terminal 20.3 is connected to a supply line 21 which connects to terminals $b$ and $c$ of the forward — reverse (or in and out) selector switch 18 so that in either position of the switch 18, the supply line 21 is connected to one side of the armature 12.1 through one of the blades 18.1, 18.2 of the selector switch. In the condition of switch 18 illustrated, the supply line 21 is connected through terminal $c$ and a blade 18.2 to the armature.

Figure 3:
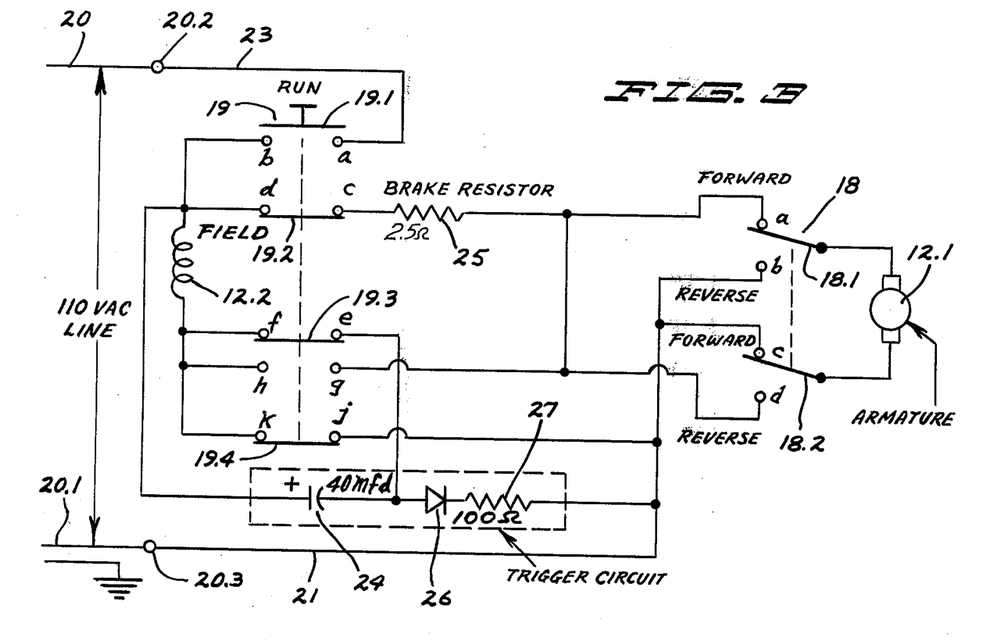
FIG. 3 is a schematic circuit diagram showing one embodiment of the invention.

The terminal 20.2 is connected by a supply line 23 to contact $a$ of the momentary push button "run — stop"- switch 19. The switch 19 has a first pair of contacts *a, b* and a spanner blade 19.1 in normally open position; a second pair of contacts *c, d* and a second spanner blade 19.2 in normally closed potition; a third pair of contacts *e, f*, and a third spanner blade 19.3 in normally closed position on contacts *e* and *f*; and the same spanner blade 19.3 is in normally open relation to another set of contacts *g, h* so that when the push button switch 19 is depressed to operate, the spanner blade 19.3 will interconnect the contacts *g, h*; and another pair of contacts *j, k* and a cooperating spanner blade 19.4 which is in normally closed condition on contacts *j, k*.

Each of contacts *b* and *d* of the push button switch 19, and also the positive side of a pulsing condenser 24 are connected to one side of the field winding 12.2. The other side of the field winding 12.2 is connected to each of contacts *f, h* and *k* of switch 19. The condenser 24 may typically have a size of 40 mfd.

Contact *c* of switch 19 is connected directly to the brake resistor, which is a wire wound resistor to withstand a substantial current flow but has a resistance of only 2.5 ohms. This low resistance carries a very significant current for a short period of time at braking. The other side of the brake resistor 25 is connected directly to each of contacts *a* and *d* of selector switch 18, and to contact *g* of push button switch 19.

The negative side of condenser 24 is connected directly to contact *e* of push button switch 19 and is connected through a diode 26 and a current limiting resistor 27 to the supply line 21. Resistor 27 may have a size of approximately 100 ohms. The diode 26 and resistor 27 provide a charging circuit for the condenser 24 when the push button switch 19 is operated from its normal position.

Contact *j* of the push button switch 19 is also connected directly to the supply line 21.

Although the switch 19 is illustrated to be a push button switch, a three pole toggle switch could be substituted for the push button switch.

In operation, the selector switch 18 is normally put in the proper position so that the motor 12 will operate in the desired direction, either forward or reverse, so as to run the cable in toward or out from the spool. In normal operation, the selector switch is operated while the motor is disconnected from the line.

When the push button switch 19 is operated from its normal position, the motor is operated so as to turn the winch spool or drum 13. When the push button switch 19 is released, line voltage is removed from the motor 12 and dynamic braking substantially stops the motor armature and the winch drum 13.

More specifically, when the push button switch 19 is operated, blade 19.1 closes contacts *a, b* to apply line voltage to one side of the field winding 12.2; and the other side of the field winding 12.2 is connected through contacts *g, h* which have been connected together by spanner blade 19.3, to contact *a* and blade 18.1 of selector switch 18 to one side of the armature 12.1; and the other side of the armature 12.1 is connected to the other side of the line through blade 18.2 and contact *c* of selector switch 18 and supply line 21. Therefore, in this condition it will be understood that the field winding 12.2 and the armature 12.1 are connected in series with each other and directly across the supply line 20, 20.1. At this same time, condenser 24 is charged to line voltage through the diode 26 and resistor 27.

When the push button switch 19 is in operative condition, contacts *c, d* are open, contacts *e, f* are open, and contacts *j, k* are open.

When the push button switch 19 is released, all of the spanner blades return to their normal positions as illustrated in FIG. 3. Contacts *a, b* are reopened to disconnect the motor field winding 12.2 and armature from the supply line 23 so that no external voltage or current is thereafter supplied to the motor while the push button switch 19 remains in released condition.

Release of switch 19 also causes contacts *c, d* to be connected so as to connect the brake resistor 25 between the armature 12.1 and the field winding 12.2. Release of push button switch 19 also causes contacts *g, h* to be opened, and contacts *j, k* to be closed by spanner blade 19.4 with the effect that the connections between the field winding 12.2 and the armature 12.1 are reversed, as compared to the connections to the armature that had existed moments before, and thereby connect the armature 12.1 to operate as a generator, instead of as a motor. Lastly, contacts *e, f* of push button switch 19, when released, are interconnected by spanner blade 19.3 so as to connect the charged condenser 24 directly across the ends of field winding 12.2. When the condenser 24 is connected directly across the field winding 12.2 in this manner, the charge from the condenser produces a pulse of current through the field winding 12.2 to produce a magnetic field of sufficient intensity as to cause the rapidly revolving armature to generate a current.

At the time the condenser 24 pulses winding 12.2, the field winding 12.2, brake resistor 25 and armature 12.1 are all connected in series with each other so that the current generated in the armature continues the current flow through the field winding 12.2 to continue the magnetic field which has already started. This generation of current in the armature rotating in the magnetic field winding 12.2 causes the dynamic braking of the entire motor and winch so as to decelerate the winch to the point at which, in most cases, the speed reduction mechanism 15 will entirely stop the winch and motor.

It will be noted that, in addition to the triggering of the dynamic braking by application of the pulse of current from condenser to the field winding 12.2, this circuit arrangement of FIG. 3 has the advantage that dynamic braking of the motor and winch is effected even though the source of power at line 20, 20.1 fails because the condenser 24 is charged for the necessary purpose when the push button switch 19 is first operated into run condition. Any time thereafter that push button switch 19 is released, even though the source of power at lines 20, 20.1 has failed, the dynamic braking will operate and be triggered by the pulse of current from condenser 24.

Figure 4:
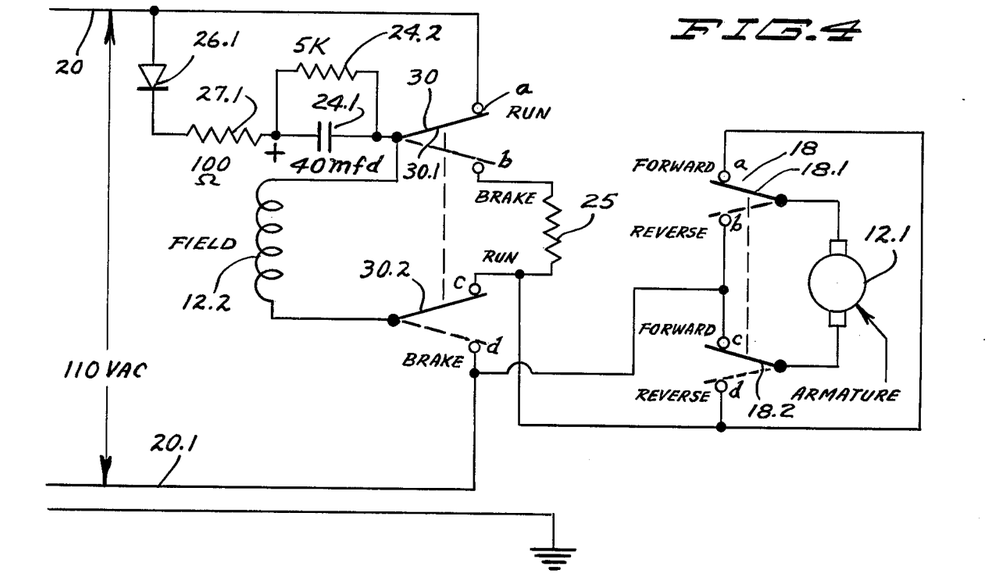
FIG. 4 is a schematic circuit diagram illustrating another embodiment of the invention.

An alternate circuit is illustrated in FIG. 4, and the principal difference is caused by the substitution of a double pole, double throw switch or two position toggle switch 30 in place of the push button switch 19. Also, the circuit providing the triggering pulse for the field winding 12.2 is necessarily arranged slightly differently than the circuit of FIG. 3.

In this form, the power supply lines 20, 20.1 are connected directly to the terminals *a, d*, respectively, of the toggle switch 30. Contact *d* of switch 30 is connected directly to contacts *b, c* of selector switch 18.

In this circuit, the low resistance 25 is connected directly between each of the contacts *b, c* of toggle switch 30; and contact c of toggle switch 30 is connected directly to each of contacts d, a of selector switch 18.

As in the previous circuit, the blade 18.1 which alternately moves into engagement with contacts a and b, is connected directly to one side of the armature 12.1, and the other side of the armature 12.1 is connected directly to the other blade 18.2 which is alternately connected to either of contacts c, d of selector switch 18.

The field winding 12.2 of the motor is connected at its opposite ends to blades 30.1 and 30.2, respectively, of the toggle switch 30. Blade 30.1 alternately connects to contacts a, b while blade 30.2 alternately connects to contacts c, d, respectively.

Whereas one end of the field winding 12.2 is connectable to the supply line 20 through blade 30.1 of the toggle switch, the same end of the field winding is also connected to the supply line through series connected condenser 24.1, current limiting resistor 27.1 and diode 26.1.

The condenser 24.1 has a capacity of 40 mfd; resistor 27.1 may have a value of 100 ohms. It will be recognized that the condenser is essentially in shunt relation to the switch blade 20.1 so that when the blade 30.1 is closed against contact a of toggle switch 30, the condenser 24.1 is essentially shorted and will not maintain a charge. However, when the blade 30.1 of the toggle switch moves away from contact a, the supply line 20 is disconnected from the field winding 12.2 so that current is no longer supplied through the switch; however, at this moment, the condenser 24.1 is no longer shorted, and a pulse of current immediately flows through the diode 26.1, resistor 27.1 to charge the condenser 24.1. This charging pulse also flows through the field winding 12.2 and through the blade 30.2 of the toggle switch to contact d to the other side of the supply line 20.1. It will therefore be understood that when the toggle switch is shifted from run position to brake position, the field winding is disconnected from the supply line 20 and a pulse of current is applied to the field winding to create the magnetic field to assure that the dynamic braking is effected.

In the normal run position of toggle switch 30, the field winding 12.2 is connected in series with the armature 12.1 through blade 30.2 and contact c of the toggle switch 30 and through contact a and blade 18.1 of selector switch 18; and the other side of the armature is connected through blade 18.2 and contact c of the selector switch 18 to the other side of the line 20.1.

As the toggle switch 30 is shifted from run to brake position, the brake resistor 25 is connected in series between the field winding 12.2 and the armature, and particularly through blade 30.1 of the toggle switch, and the connections to the armature from the field winding are reversed so as to cause the armature to act as a generator. The reversal of the connection to the armature is obtained by shifting of blade 30.2 of the toggle switch whereby the end of field winding 12.2 and blade 30.2 are connected through blade 18.2 to one side of the armature 12.1 while the other side of the armature is connected through blade 18.1 of the selector switch to the supply line 20.1.

In summary, with respect to FIG. 4, it will be noted that shifting of blade 30.2 of the toggle switch reverses the connection to the armature and connects one end of the field winding to the supply line 20.1 so as to prepare the field winding to receive the pulse of current; and the shifting of blade 30.1 has the effect of bringing the brake resistor 25 into the circuit between the armature and field winding and also disconnects the line 20 from the field winding so as to render the condenser 24.1 effective for charging and producing a pulse of current in the field winding for creation of a magnetic field to start generation of current in the revolving armature.

In the circuit of FIG. 4, reliance is placed on the continued existence of voltage across the lines 20 and 20.1 to facilitate generation of a pulse of current through the field winding as the condenser 24.1 charges. An additional resistor 24.2 is connected in shunt across the condenser 24.1 for the purpose of discharging the condenser whenever the toggle switch 30 is shifted to run position, thereby preparing the condenser to receive a charge and produce a pulse of current through the field winding and trigger the dynamic braking whenever the toggle switch is shifted back to brake position.

Figure 5:
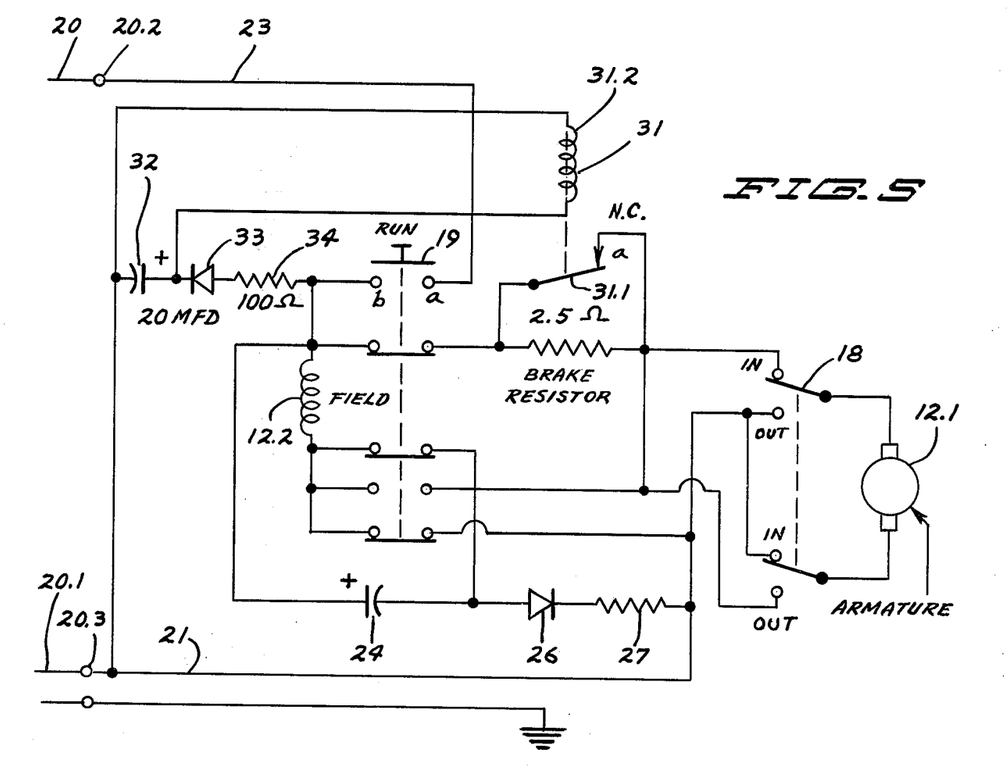
FIG. 5 is a schematic circuit diagram illustrating an additional aspect of the present invention.

An additional aspect of the invention is illustrated in the schematic circuit of FIG. 5 which is essentially the same as the circuit of FIG. 3 with the exception that certain additions have been made. In this form of the invention, a relay 31 is arranged so that its blade 31.1 is normally closed against contact a, and the blade 31.1 and contact a thereof are connected to opposite sides of the brake resistor 25 for the purpose of shorting the brake resistor 25 out of the circuit when the relay 31 is de-energized and the blade is closed against the contact. The shorting of the brake resistor 25 produces a second dynamic braking of the motor and armature after the dynamic braking effect has been lost due to the significant deceleration of the armature as a result of the initial dynamic braking which produces current flow through the brake resistor. The shorting of the brake resistor reduces the overall impedance in the series connected armature 12.1 and the field winding 12.2 so as to increase the current through the field winding and produce additional magnetic field and to cause generation of additional current in the armature due to the continued revolving of the armature through the increased magnetic field.

The relay coil 31.2 is normally energized while the motor is running, and remains in energized condition for a short time delay after the push button switch 19 is released and the circuit is switched to the brake condition, whereupon, after approximately a half second, the relay winding 31.2 will be de-energized to allow the relay contacts to return to normal condition and cause shorting of the brake resistor to produce the second dynamic braking. The relay winding 31.2 is connected across a condenser 32 which is of a substantial size and may have a capacity of approximately 20 mfd. The condenser 32 is connected in series with a diode 33 and in series with a current limiting resistor 34 which may have a typical resistance of 100 ohms. The series connected condenser 32, diode 33 and resistor 34 are connected between contact b of the push button switch 19 and the supply line 21 so as to cause charging of the condenser 32 anytime the push button switch 19 is closed. Current from the series connected resistor 34 and diode 33 also supplies the relay coil 31.2 whenever the push button switch 19 is pressed to maintain the brake 31.1 away from the contact a of the relay.

Whenever the push button switch 19 is released, the dynamic braking of the motor and winch occurs instantly, and after approximately a quarter of a second the deceleration and braking effect is considerably reduced because of the reduced current flow through the armature; and approximately a half second after release of the push button switch 19, the condenser 32 will have fully discharged through the relay coil 31.2, and as the current through the relay winding reduces, the blade 31.1 of the relay returns to its normally closed condition against contact *a*.

Whenever this occurs, the brake resistor 25 is shorted which tends to decrease the overall impedance or resistance in the series connected armature and field winding and the current will immediately increase again to produce a significant second braking of the motor armature. This second braking of the armature will reduce the speed of the armature and winch drum to the point wherein the speed reducing mechanism 15 will assuredly stop the rotation of the armature and winch drum.

The circuit of FIG. 4, with the double pole double throw toggle switch, may also be modified with a time delay relay and relay contacts to short the brake resistor. In such modification, the relay coil shunts the relay holding condenser which is connected in series with the charging circuit including the diode and resistor and connected between the blade 30.1 of the toggle switch and the supply line 20.1, very similarly to the manner in which the comparable circuitry is connected in FIG. 5.

Figure 6:
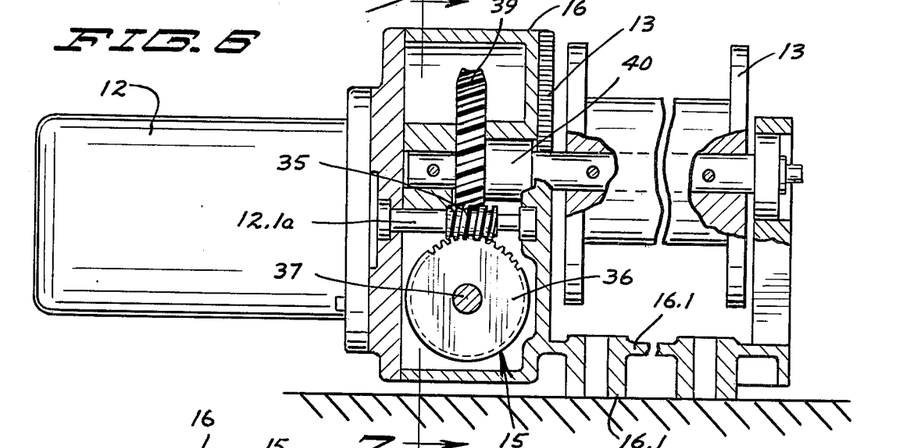
FIG. 6 is a detail section view through the gear case of the winch.
Figure 7:
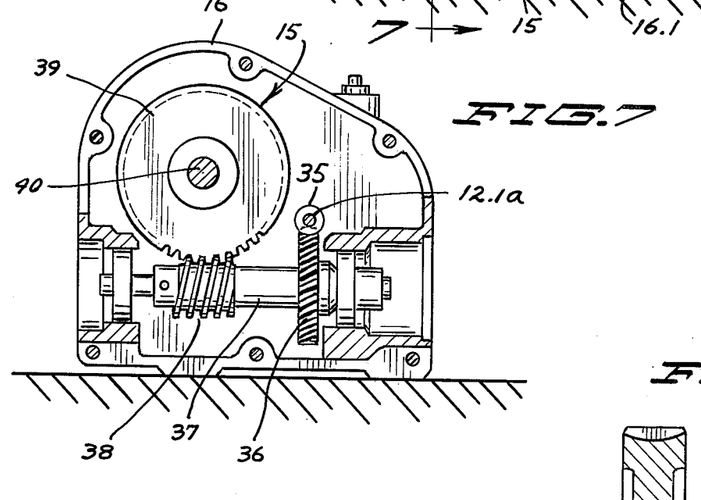
FIG. 7 is another detailed section through the gear case of the winch as illustrated at 7—7 in FIG. 6.

The speed reducing mechanism 15 confined in the gear case or housing 16 includes a worm 35 affixed on the armature shaft 12.1a of motor 12. The extreme terminal end of the armature shaft is carried in a bearing mounted in the gear case housing. A worm gear 36 is meshed with the worm 35 and is affixed to a shaft 37 which is journaled in suitable bearings at both ends of the shaft, and the bearings retain the shaft 37 in predetermined physical relationship with the gear case housing and with the worm 35. Another worm 38 is affixed on the shaft 37 to turn therewith and with the worm gear 36.

A second worm gear 39 is meshed with the worm 38 and is affixed upon the drive shaft 40 which extends from the interior of the gear case 16 to the exterior thereof and mounts the winch drum 13 thereon. The shaft 40 is carried in suitable bearings on the gear case housing and on the frame 16.1 of the winch.

It will be recognized that the worm 35 and worm gear 36 form a first speed reduction mechanism, and the worm 38 and worm gear 39 form a second speed reduction mechanism. These two tandemly arranged speed reducing mechanisms produce a speed reduction in the range of the ratio of 533 to 1 so that the motor armature will revolve at a speed of 533 times the speed of the winch drum.

In order to obtain this speed reduction, the first stage of speed reduction produces a 40 to 1 ratio, there being 40 teeth on the worm gear 36 and a single thread single start on the worm 35; and the second stage of the speed reduction with a ratio of 13.33 is obtained by the worm gear 39 with 40 teeth and a three thread worm 38.

This speed reduction mechanism which produces the overall reduction in the ratio of 533 to 1 will stop the motor armature and winch drum with a single stage of dynamic braking as described in connection with FIGS. 1 – 4. Whenever the dynamic braking produces the significant reduction in speed, the speed will be reduced to the point wherein the speed reducing mechanism 15 with a ratio of 533 to 1 will stop the armature and winch drum.

In other instances wherein a somewhat faster operating winch is desired, a different speed reduction ratio is utilized in the mechanism 15. For instance, it may be desirable to produce an overall speed reduction with a ratio of 267 to 1, whereupon the first stage of speed reduction is produced by the worm 35 and worm gear 36 which are formed with the same number of teeth and threads as previously described so as to produce a first stage speed reduction in the ratio of 40 to 1. The second stage speed reduction is changed to change the overall effective speed reduction of the mechanism 15. Accordingly, the worm gear 39 will continue to have 40 teeth, but the worm 38 is changed to a six thread six start worm which cooperates with the worm gear 39 in producing a speed reduction with a ratio of 6.67 to 1. This speed reduction or gearing between worm 38 and worm gear 39 is considerably more efficient than the gear reduction previously described wherein the worm 38 was a three thread worm.

Because of the more efficient relationship between the six thread worm 38 and the 40 tooth gear 39, the speed reduction mechanism, having an overall speed reduction with a ratio of 267 to 1, is less likely to stop the motor armature and winch drum even with a second dynamic braking caused by the shorting of the brake resistor 25 as described in connection with FIG. 5.

Figure 8:
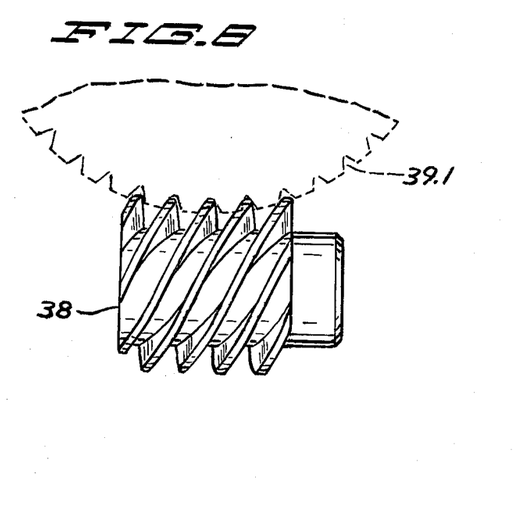
FIG. 8 is an enlarged detail view illustrating the relationship between the worm and worm gear according to the present invention.
Figure 9:
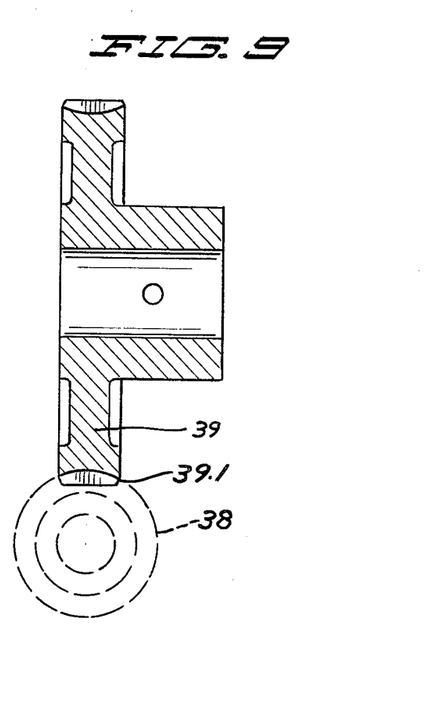
FIG. 9 is an enlarged detail view of a worm gear in section and illustrating its relationship to the worm according to the present invention.

In order to increase the slow speed stopping or braking effect, the shape of the teeth of worm gear 39 is changed so that more metal to metal contact is obtained between the worm and worm gear at slow speeds. This is effected by reducing the contact face area of the teeth of the worm gear.

The worm 38 has an axis which lies perpendicular to the axis of worm gear 39. Normally, the end edge or end surface of the teeth 39.1 of worm gear 39 are shaped to a circular arc so as to be generally cylindrical about the axis of the worm gear. According to the present invention, the teeth 39.1 of the worm gear 39 are changed in shape so that the teeth are shortened in a direction radially inwardly toward the worm gear axis to the extent that the teeth 39.1 may be approximately 40 percent of their previous length. In addition, the end edge or face of each of the teeth 39.1 is reshaped to subscribe a partial cylinder about the worm gear axis. This change in the shape of the teeth 39.1 of the worm gear produces a reduction in the degree of meshing between the worm 38 and worm gear 39 so that the contact face area between the teeth 39.1 and the thread of the worm 38 is considerably reduced, whereas the speed reduction ratio produced by the cooperating worm and worm gear is not changed as a result of the modification in tooth shape.

The modification in tooth shape has the effect of producing additional braking of the motor armature and winch drum after the dynamic braking has been completed and the second stage of dynamic braking has been completed so that the winch drum will completely stop and be retained in the desired position without additional creeping due to the overhauling load or continuing load exerted through the cable and tending to rotate the winch drum. It will be seen that by applying a pulse of current to the field coil of the universal motor from an exterior source produces an effective triggering of the dynamic braking so that the effect of an overhauling load will not prevent the dynamic braking from operating and stopping the motor and winch. It will further be noted that a second dynamic braking is obtained by shorting out the braking resistor after a short time delay subsequent to initiating the dynamic braking so as to reduce the resistance or impedance in the motor circuit and increase the dynamic braking effect to produce the necessary braking to essentially stop the motor and winch drum. It will further be seen that additional braking of the universal motor and winch drum is effected by modifying the shape of the teeth on the worm gear in one of the tandemly arranged speed reduction mechanisms so as to decrease the surface contact area and increase the metal to metal contact between worm and worm gear at slow speeds without adversely affecting the high speed reduction of the mechanism to thereby effectively stop the winch drum and motor armature in spite of the continued existence of a load on the cable connected to the winch drum.

What is claimed is:

1. In a universal motor having the field and armature windings connected in series;
   means producing dynamic braking of the armature and including
   switching means disconnecting the windings from the current supply line and reversing connections to the armature winding to effectively cause the motor to act as a generator, the switching means also connecting a low braking resistance across the series connected field and armature windings; and
   a current source connected to the field winding independently of the armature winding and rendered operative by the switching means to supply a pulse of current through the field winding when the supply line is disconnected from the windings by the switching means.

2. The invention as set forth in claim 1 and including a condenser connected in shunt with the field winding and discharging through the field winding to supply said pulse of current in the field winding when the supply line is disconnected.

3. The invention set forth in claim 2 and said switching means providing a discharge connection between the condenser and the field winding.

4. The invention according to claim 2 and a charging circuit, including a diode for said condenser whereby the condenser is fully charged immediately after the line is first connected to the motor windings and until the condenser discharges through the field winding after the line is disconnected.

5. The invention according to claim 2 and including time delay switch means in shunt with the low braking resistance and closing after a moment of delay subsequent to operation of the switching means, whereby to increase the current in the field winding again to effect a second and renewed dynamic braking of the motor.

6. The invention according to claim 3 and the switching means being phased to close said discharge connection after the disconnection from the supply line and the reversal of the connections and the connection of the braking resistance.

7. The invention according to claim 1 and including a condenser connected in shunt with the disconnect switching means between the line and the field winding to charge from the line when the winding is disconnected from the line and thereby supply a pulse of current to the winding.

8. The invention according to claim 1 and the switching means including a switch between the field winding and one side of the line, and a series connected condenser and diode connected between said one side of the line and the field winding and in shunt with said switch to charge when the switch is opened and produce a pulse of current through the field winding.

9. The invention according to claim 1 and the switching means comprises a double throw, double pole switch.

10. The invention according to claim 1 and the switching means comprises a multiple contact push button switch for momentary operation.

11. In a universal motor,
    a braking resistance;
    a current supply line to normally supply current to the field and armature windings of the motor;
    switching means to disconnect the supply line from the motor windings and to reverse the connections to the armature windings when the braking resistance is connected across the series connected field and armature windings; and
    a supplemental current source to direct a pulse of current to the field winding independently of the armature windings after termination of the flow of current from the line and switching means to the field winding.

12. A method of operating a universal motor with dynamic braking wherein the line is disconnected by switching from the series connected field and armature windings and the connections to the armature are reversed at the same time, and a braking resistance is applied as a load across the series connected field and armature windings of the motor, the method steps consisting in applying a pulse of current through the field winding and independently of the armature winding from a supplemental current source after such switching to commence the generator effect in the armature which results in the braking effect.

13. The method according to claim 12 wherein the applying of a pulse of current is produced by discharging a charged condenser through the field winding.

14. The method according to claim 12 wherein the applying of a pulse of current is produced by charging a condenser from the line and through the field winding.

15. In a universal motor,
    a braking resistance;
    a current supply line to nromally supply current to the field and armature windings of the motor;
    switching means to disconnect the supply line from the motor windings and to reverse the connections to the armature windings when the braking resistance is connected across the series connected field and armature windings; and
    a time delay switching means operating independently of applied voltage across the braking resistance and after a delay subsequent to operation of said first mentioned switching means to short out the braking resistance to increase the current in the armature and renew the braking effect.

16. The invention according to claim 15 and including a relay with normally closed contacts and a relay coil; and
    a series connected diode and relay holding condenser connected in shunt with the field winding whereby the relay holding condenser is charged when the field winding is energized from the line, the relay coil connected in shunt with the relay holding condenser to receive current and hold the contacts open for a moment after the field winding is initially disconnected from the line after which the braking effect is renewed.

17. The invention according to claim 15 and said time delay switching means including relatively movable switch contacts to mechanically make and break to short out the braking resistance.

18. The invention according to claim 15 and said time delay switching means having time delay circuit means connected and responsive to voltage at the supply line to predetermine said delay.

19. In a universal motor having the field and armature windings connected in series;

means producing dynamic braking of the armature and including switching means disconnecting the windings from the current supply line and reversing connections to the armature winding to effectively cause the motor to act as a generator, the switching means also connecting a low braking resistance across the series connected field and armature windings; and a current source connected through and by operation of the switching means across the field winding without regard for the armature winding and applying a pulse of current through the field winding independently of the armature winding when the switching means is operative.

20. The invention set forth in claim 19 and the current source including a condenser controlling termination of the pulse of current.

* * * * *